United States Patent
You et al.

(10) Patent No.: US 12,002,922 B2
(45) Date of Patent: *Jun. 4, 2024

(54) ELECTRODE ASSEMBLY HAVING HIGH FLEXIBILITY AND BATTERY CELL INCLUDING THE SAME

(71) Applicant: LG Chem, Ltd., Seoul (KR)

(72) Inventors: Min Kyu You, Daejeon (KR); Sung Joong Kang, Daejeon (KR); Ji Young Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 505 days.

This patent is subject to a terminal disclaimer.

(21) Appl. No.: 15/767,541

(22) PCT Filed: Mar. 31, 2017

(86) PCT No.: PCT/KR2017/003534
§ 371 (c)(1),
(2) Date: Apr. 11, 2018

(87) PCT Pub. No.: WO2017/171459
PCT Pub. Date: Oct. 5, 2017

(65) Prior Publication Data
US 2018/0287103 A1    Oct. 4, 2018

(30) Foreign Application Priority Data

Mar. 31, 2016 (KR) .......................... 10-2016-0038804

(51) Int. Cl.
*H01M 10/0525* (2010.01)
*H01M 10/04* (2006.01)
(Continued)

(52) U.S. Cl.
CPC ... *H01M 10/0525* (2013.01); *H01M 10/0431* (2013.01); *H01M 10/0436* (2013.01);
(Continued)

(58) Field of Classification Search
CPC ......... H01M 10/0436; H01M 10/0431; H01M 50/105; H01M 50/136; H01M 50/46; H01M 10/0587; H01M 10/0525
See application file for complete search history.

(56) References Cited

U.S. PATENT DOCUMENTS

2003/0108787 A1  6/2003  Endo et al.
2005/0123824 A1  6/2005  Ishikawa et al.
(Continued)

FOREIGN PATENT DOCUMENTS

EP    2075868 A2   7/2009
EP    2309582 A2   4/2011
(Continued)

OTHER PUBLICATIONS

Search report from International Application No. PCT/KR2017/003534, dated Jul. 17, 2017.
(Continued)

*Primary Examiner* — Sarah A. Slifka
(74) *Attorney, Agent, or Firm* — Lerner David LLP

(57) ABSTRACT

The present invention provides an electrode assembly having a one directionally spiral-wound structure with a separator sheet interposed between a positive electrode sheet and a negative electrode sheet, wherein the electrode assembly has a horizontal length (x) equal to or more than three times a vertical length (y), and both side end portions of the electrode assembly are bent together in the same direction by a curvature radius (R) satisfying the following Equation 1:

$$S[\{1/\ln(x/y)\}*t]=R \qquad 1$$

wherein t is an average thickness (mm) of the spiral-wound electrode assembly, x is the horizontal length of the elec-
(Continued)

trode assembly, and y is the vertical length of the electrode assembly, and S is a constant of 8 or more, and $\ln(x/y) \geq 1$.

9 Claims, 4 Drawing Sheets

(51) Int. Cl.
  *H01M 10/0587* (2010.01)
  *H01M 50/105* (2021.01)
  *H01M 50/136* (2021.01)
  *H01M 50/46* (2021.01)

(52) U.S. Cl.
  CPC ..... *H01M 10/0587* (2013.01); *H01M 50/105* (2021.01); *H01M 50/136* (2021.01); *H01M 50/46* (2021.01); *Y02E 60/10* (2013.01); *Y02T 10/70* (2013.01)

(56) References Cited

U.S. PATENT DOCUMENTS

| | | |
|---|---|---|
| 2012/0177963 A1 | 7/2012 | Lee et al. |
| 2012/0183825 A1 | 7/2012 | Lee et al. |
| 2014/0234679 A1 | 8/2014 | Kim et al. |
| 2014/0342220 A1* | 11/2014 | Kim ............... H01M 2/02 429/186 |
| 2015/0099161 A1 | 4/2015 | Hitotsuyanagi et al. |
| 2015/0118533 A1 | 4/2015 | Yi |
| 2015/0207110 A1 | 7/2015 | Seong |
| 2016/0079579 A1* | 3/2016 | Jung ............... H01M 2/0217 429/56 |
| 2018/0301760 A1* | 10/2018 | You ............... H01M 2/02 |

FOREIGN PATENT DOCUMENTS

| | | |
|---|---|---|
| EP | 2482356 A2 | 8/2012 |
| JP | 2003123706 A | 4/2003 |
| JP | 2012151110 A | 8/2012 |
| JP | 2015015245 A | 1/2015 |
| JP | 2015138779 A | 7/2015 |
| JP | 2016131148 A | 7/2016 |
| KR | 20040088500 A | 10/2004 |
| KR | 20120082808 A | 7/2012 |
| KR | 20130076838 A | 7/2013 |
| KR | 20140104888 A | 8/2014 |
| KR | 20150036911 A | 4/2015 |
| KR | 20150040224 A | 4/2015 |
| KR | 20150040421 A | 4/2015 |
| WO | 2002043178 A1 | 5/2002 |

OTHER PUBLICATIONS

Supplementary European Search Report for EP17775883 dated Dec. 14, 2018.

* cited by examiner

[Figure 1]
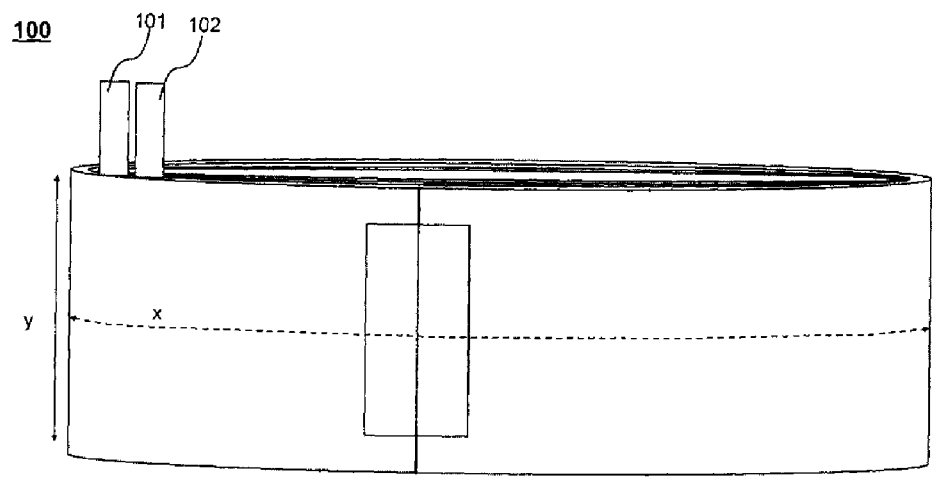

[Figure 2]
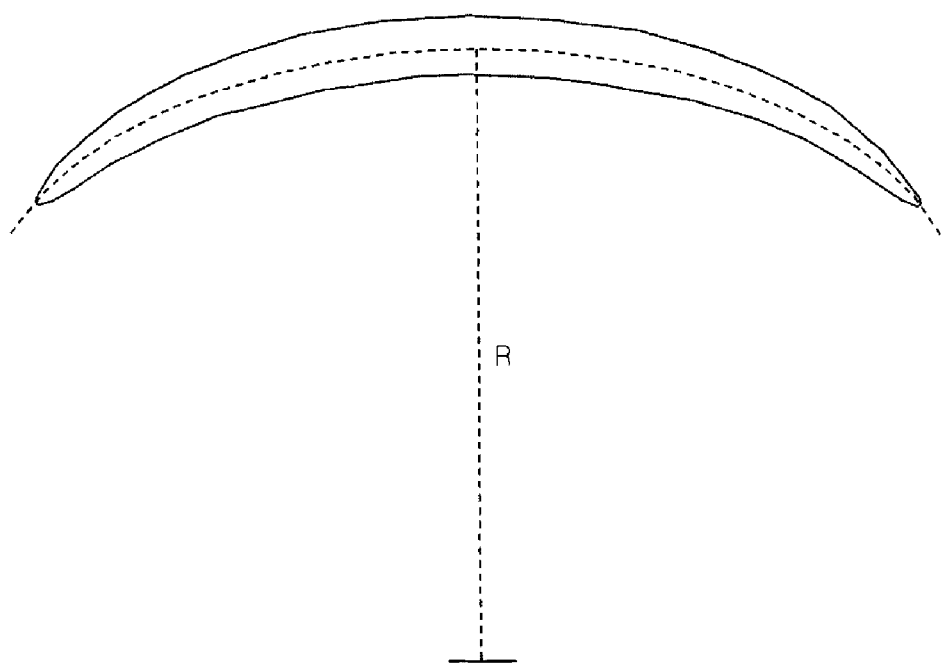

【Figure 3】
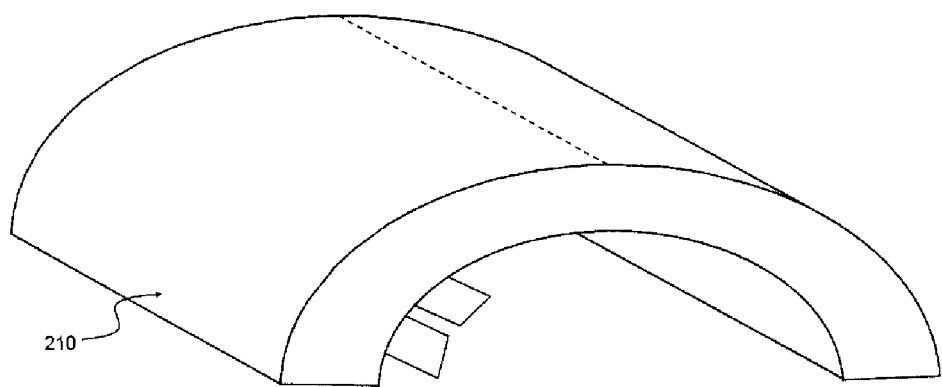

[Figure 4]
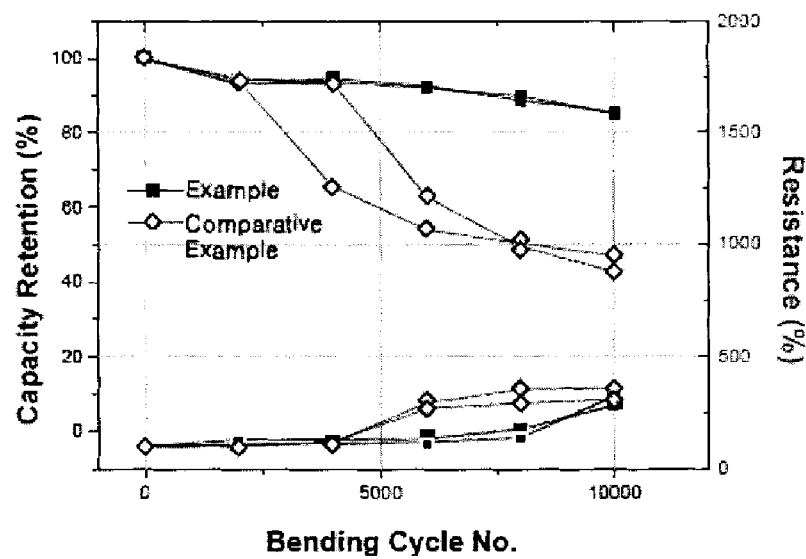

ELECTRODE ASSEMBLY HAVING HIGH FLEXIBILITY AND BATTERY CELL INCLUDING THE SAME

CROSS-REFERENCE TO RELATED APPLICATIONS

This application is a national stage entry under 35 U.S.C. § 371 of International Application No. PCT/KR2017/003534 filed on Mar. 31, 2017, published in Korean, which claims priority to and the benefit of from Korean Patent Application No. 10-2016-0038804 filed in the Korean Intellectual Property Office on Mar. 31, 2016, the entire contents of which are incorporated herein by reference.

TECHNICAL FIELD

The present invention relates to an electrode assembly having high flexibility, and a battery cell including the same.

BACKGROUND

As IT (information technology) has been stunningly developed, the spread of various portable information communication equipment is made, which leads to the development into ubiquitous society allowing high quality information service regardless of time and place in the 21$^{st}$ century.

In the basis of the development into this ubiquitous society, a lithium secondary battery takes an important place. Specifically, a chargeable and dischargeable lithium secondary battery is widely used as an energy source of a wireless mobile device, and also as an energy source of electric cars, hybrid electric cars and the like which has been suggested as measures to resolve air pollution and the like of existing gasoline vehicles, diesel vehicles and the like using fossil fuels.

As described above, as devices to which the lithium secondary battery is applied are diversified, the lithium secondary battery is also diversified so that output and capacity appropriate for the applied device may be provided. In addition, the lithium secondary battery is strongly required to be smaller, lighter and thinner.

The lithium secondary battery may be classified into a cylindrical battery cell, an angular shape battery cell, a pouch shape battery cell and the like, according to its shape, and these battery cells have a structure in which an electrode assembly including an electrode and a separator is mounted on a battery case together with an electrolyte solution.

Meanwhile, the design of the device may not be formed of only a rectangular parallelepiped shape, and may have a bendable shape. For example, a smart phone may be subjected to side curve processing for improving grip feeling, and a flexible display may be curved or bent, and manufactured in various forms.

Since the device which is designed to have a curved portion or may be bent like this has a limitation in embedding a battery cell having a specific shape in the space inside the device, recently, the battery cell is required to have a flexible characteristic, so that it may be easily embedded in the devices of various designs.

Accordingly, there is currently a high need for an electrode assembly and a battery cell which may be flexibly applied to a device, corresponding to the device having various shapes.

Technical Problem

The object of the present invention is to solve the problems of the conventional art as described above, and the technical challenges which have been requested from the past.

Specifically, the present invention has been made in an effort to provide an electrode assembly having advantages of having naturally curved shape by having a relatively longer horizontal length than a vertical length, more precisely corresponding to the shape of the device with high flexibility, and maintaining the battery characteristics almost equal to those of a common electrode assembly even with repeated bending, and a battery cell including the same.

Technical Solution

An exemplary embodiment of the present invention provides an electrode assembly having a one directionally spiral-wound structure with a separator sheet interposed between a positive electrode sheet and a negative electrode sheet, wherein both side end portions of the electrode assembly are bent together in the same direction by a curvature radius (R) satisfying the following Equation 1:

$$S[\{1/\ln(x/y)\}*t]=R \qquad 1$$

wherein t is an average thickness (mm) of the spiral-wound electrode assembly, x is a horizontal length of the electrode assembly, and y is a vertical length of the electrode assembly, and S is a constant of 8 or more, and $\ln(x/y) \geq 1$.

S is an arbitrary constant determined in consideration of flexural stress of a positive electrode plate and a negative electrode plate, and elastic force of a separator.

That is, the electrode assembly according to the present invention has a relatively longer horizontal length than a vertical length, thereby being formed of a naturally curved shape, and provides a merit of capable of being applied to a device having a curved outer shape, or a device in which the outer shape is flat but the shape of the portion where a battery cell is mounted is curved.

Specifically, the constant S may be a value of 8 or more, preferably 9 to 12. Within the limitation of the curvature radius obtained when the range of the constant value is satisfied, the electrode assembly maintains the battery characteristics such as a capacity retention almost equal to those of a common electrode assembly, while being not broken even after repeated bending.

In the present invention, the curvature radius (R) is determined by an average thickness (t) and a constant S of the spiral wound electrode assembly in a range of a vertical length(y) to a horizontal length(x) being 1:3 or more. The electrode assembly having the predetermined average thickness may be freely bent within the range of the curvature radius satisfying the range of the constant S, and satisfies the battery characteristics almost equal to those of a common jelly-roll type electrode assembly even with repeated bending.

The curvature radius (R) of the above equation is a curved surface radius when the electrode assembly is bent to the maximum at a certain point, and inversely proportional to the curvature. Therefore, as the curvature radius (R) is larger, the electrode assembly is bent to have a gentle curved line, and as the curvature radius (R) is smaller, the electrode assembly is bent to have a sharp curved line.

The electrode assembly having the curvature radius as such may be naturally formed without additional external force on the basis of the horizontal length, and if required, may be derived to have a finer sized curvature radius by predetermined external force.

The reason why the electrode assembly may be formed in a curved shape as such is understood to be due to a structure having relatively increased flexibility for deformation into a curved shape by dispersing stress in a direction of the relatively long horizontal length.

In addition, the electrode assembly may be deformed into a shape having an increased or decreased curvature radius on the basis of high flexibility.

According to a specific exemplary embodiment, the horizontal length (x) may be 50 mm to 500 mm.

When the horizontal length (x) is less than 50 mm, flexibility due to an effect of dispersion of stress may not be expected, and thus, implement of the electrode assembly having the curvature radius (R) is difficult, and even in the case that the electrode assembly is forcibly deformed to have the curvature radius (R), breakage of the electrode may be caused by stress, which is, thus, not preferable.

Particularly, the electrode assembly having a structure of spiral-wound electrode and separator has stress concentrated on the spiral-wound central portion, and thus, when the electrode assembly is forcibly deformed, distortion in the spiral-wound central portion may occur, and this distortion may cause breakage of the electrode.

However, when the horizontal length (x) is more than 500 mm, the curvature radius (R) is formed to be small so that the electrode assembly may be bent much, but on the contrary, the electrode assembly may be easily deformed even with low external force from the outside, and this process is repeated to induce electrode breakage, which is not preferable.

Such cases are, however, not determined only by the numerical value of the horizontal length, and the relatively short vertical length which is ⅓ or less of the horizontal length is premised.

The ratio of the vertical length (y) to the horizontal length (x) (y:x) may be 1:3 to 1:20, specifically 1:5 to 1:10.

In the case of being out of the above range, when the horizontal length is less than three times the vertical length, the desired flexibility is difficult to be obtained, and when the horizontal length is more than 20 times the vertical range, the stiffness of the electrode assembly may be unduly deteriorated, which is not preferable.

According to a specific exemplary embodiment, the curvature radius (R) is not particularly limited as long as the electrode assembly is not excessively bent so that the electrode is not broken with the stress in the spiral-wound central portion, and maintains the desired curved shape, but specifically, the curvature radius (R) may be 5 mm to 20 mm.

Particularly, when the curvature radius (R) is less than 5 mm, the electrode assembly is bent much, and thus, the electrode may be broken by the stress formed by the spiral-wound electrode sheets and the stress produced by bending, which is not preferable.

According to a specific exemplary embodiment, the electrode assembly may have a structure in which a positive electrode lead and a negative electrode lead protrude side by side in a parallel direction to the vertical length (y).

In addition, the positive electrode lead and the negative electrode lead may be positioned at a portion relatively more adjacent to the end side than the spiral-wound central portion in the electrode assembly so that the electrode leads do not interfere with the curved shape of the electrode assembly. However, the protruding portion of the electrode lead may be differently changed if required.

The electrode assembly according to the present invention may have a structure in which the positive electrode, the negative electrode and the separator sheet are spiral-wound a limited number of times so that the horizontal length is longer while the average thickness is relatively thinner, and specifically the spiral-winding may be performed five times or less.

Another embodiment of the present invention provides a battery cell having a structure in which the electrode assembly is stored in a variable battery case together with an electrolyte solution, wherein both side end portions of the electrode assembly and the battery case in positions of facing each other are bent together in the same direction, so that a curved surface is formed on the outer surface of the battery cell.

In the present invention, the type of the battery cell is not particularly limited, however, as a specific example, may be a lithium secondary battery such as a lithium ion (Li-ion) rechargeable battery, a lithium polymer (Li-polymer) rechargeable battery, or a lithium ion polymer (Li-ion polymer) rechargeable battery having merits such as high energy density, discharge voltage and output stability.

In general, the lithium secondary battery includes a positive electrode, a negative electrode, a separator, and a lithium salt-containing non-aqueous electrolyte.

The positive electrode is manufactured by, for example, coating a mixture of a positive electrode active material, a conductive material, and a binder on a positive electrode current collector and/or an extension current collecting part, and drying it, and if required, further adding a filler to the mixture.

The positive electrode current collector and/or the extension current collecting part is/are generally manufactured to have a thickness of 3 to 500 μm. These positive electrode current collector and extension current collecting part are not particularly limited as long as they do not cause a chemical change in the battery and have high conductivity, and for example, stainless steel, aluminum, nickel, titanium, fire carbon, or aluminum or stainless steel of which the surface is treated with carbon, nickel, titanium, silver and the like may be used. The positive electrode current collector and the extension current collecting part may increase adhesion of the positive electrode active material by forming fine protrusions and depressions on the surfaces thereof, and may be formed in various forms such as a film, a sheet, foil, nets, a porous body, foam, a non-woven fabric body and the like.

The positive electrode active material may include layered compounds or compounds substituted with one or more transition metals such as lithium cobalt oxide ($LiCoO_2$) and lithium nickel oxide ($LiNiO_2$); lithium manganese oxides such as the chemical formula $Li_{1+x}Mn_{2-x}O_4$ (wherein x is 0-0.33), $LiMnO_3$, $LiMn_2O_3$, $LiMnO_2$ and the like; lithium copper oxide ($Li_2CuO_2$); vanadium oxides such as $LiV_3O_8$, $LiFe_3O_4$, $V_2O_5$ and $Cu_2V_2O_7$; Ni-site type lithium nickel oxides represented by the chemical formula $LiNi_{1-x}M_xO_2$ (wherein M=Co, Mn, Al, Cu, Fe, Mg, B or Ga, and x=0.01-0.3); lithium manganese composite oxides represented by the chemical formula $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); $LiMn_2O_4$ in which Li is partially substituted with an alkaline-earth metal ion in the chemical formula; disulfide compound; $Fe_2(MoO_4)_3$, and the like, but not limited thereto.

The conductive material is usually added at 1 to 30 wt %, based on the total weight of the mixture including the positive electrode active material. This conductive material is not particularly limited as long as it does not cause a chemical change in the battery and has conductivity, and for example, graphite such as natural graphite or artificial graphite; carbon black such as carbon black, acetylene black, ketjen black, channel black, furnace black, lamp black and summer black; conductive fiber such as carbon fiber or metal fiber; metal powder such as fluorocarbon, aluminum and nickel powder; conductive whisky such as zinc oxide and potassium titanate; conductive metal oxides such as titanium oxide; conductive materials such as a polyphenylene derivative, and the like may be used.

The binder is a component assisting in binding the active material to the conductive material and the like, and binding to the current collector, and generally added at 1 to 30 wt %, based on the total weight of the mixture including the positive electrode active material. As an example of this binder, polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butyrene rubber, fluorine rubber, various copolymers, and the like may be listed.

The filler is a component suppressing expansion of the positive electrode, and optionally used. It is not particularly limited as long as it does not case a chemical change in the battery and is a fibrous material, and for example, olefin-based polymers such as polyethylene and polypropylene; and fibrous materials such as glass fiber and carbon fiber may be used.

The negative electrode is manufactured by coating a negative electrode active material on the negative electrode current collector and/or the extension current collecting part, and drying it, and if necessary, the components as described above may be optionally further included.

The negative electrode current collector and/or the extension current collecting part is/are generally manufactured to have a thickness of 3 to 500 µm. This/these negative electrode current collector and/or extension current collecting part is/are not particularly limited as long as they do not cause a chemical change in the battery and have conductivity, and for example, copper, stainless steel, aluminum, nickel, titanium, fire carbon, or copper or stainless steel of which the surface is treated with carbon, nickel, titanium, silver and the like may be used, an aluminum-cadmium alloy, and the like may be used. In addition, like the positive electrode current collector, binding force of the negative electrode active material may be enhanced by forming fine protrusions and depressions on the surfaces thereof, and various forms such as a film, a sheet, foil, nets, a porous body, foam, a non-woven fabric body and the like may be used.

As the negative electrode active material, for example, carbons such as hard carbon and graphite-based carbon; metal composite oxides such as $LixFe_2O_3$ ($0 \leq x \leq 1$), $LixWO_2$ ($0 \leq x \leq 1$), $Sn_xMe_{1-x}Me'_yO_z$ (Me: Mn, Fe, Pb or Ge; Me': Al, B, P, Si, an element of Group 1, 2 or 3 of the periodic table, or halogen; $0 < x \leq 1$; $1 \leq y \leq 3$; $1 \leq z \leq 8$); a lithium metal; a lithium alloy; a silicon-based alloy; a tin-based alloy; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers such as polyacetylene; Li—Co—Ni-based materials, and the like may be used.

The separator is interposed between the positive electrode and the negative electrode, and an insulating thin membrane having high ion transmission and mechanical strength is used. The separator has a pore diameter of generally 0.01-10 µm, and a thickness of generally 5-300 µm. As this separator, for example, olefin-based polymers such as chemical resistant and hydrophobic polypropylene; a sheet or non-woven fabric prepared by glass fiber, polyethylene or the like. When a solid electrolyte such as a polymer is used as the electrolyte, the solid electrolyte may be also used as the separator.

The electrolyte solution may be a lithium salt-containing non-aqueous electrolyte solution, and is composed of the non-aqueous electrolyte solution and the lithium salt. As the non-aqueous electrolyte solution, a non-aqueous organic solvent, an organic solid electrolyte, an inorganic solid electrolyte and the like are used, but not limited thereto.

As the non-aqueous organic solvent, for example, aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxy (franc), 2-methyl tetrahydrofuran, dimethylsulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, ethyl propionate and the like may be used.

As the organic solid electrolyte, for example, polymers including a polyethylene derivative, a polyethylene oxide derivative, a polypropylene oxide derivative, a phosphate ester polymer, poly agitation lysine, polyester sulfide, polyvinyl alcohol, polyvinylidene fluoride, an ionic dissociating group and the like may be used.

As the inorganic solid electrolyte, for example, nitrides, halides and sulfates of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$DeletedTexts and the like may be used.

The lithium salt is a material which is easily dissolved in the non-aqueous electrolyte, and for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic lithium carbonate, 4-phenyl lithium borate, imide, and the like may be used.

In addition, to the non-aqueous electrolyte solution, for improving a charge and discharge characteristic, flame retardancy and the like, for example, pyridine, triethylphosphite, triethanolamine, cyclic ether, ethylene diamine, n-glyme, triamide hexaphosphate, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, aluminum trichloride, and the like may be added. If necessary, for imparting nonflammability, a halogen-containing solvent such as carbon tetrachloride and ethylene trifluoride may be further included, and for improving a storage characteristic at high temperature, carbon dioxide gas may be further included, and FEC (fluoro-ethylene carbonate), PRS (propene sultone) and the like may be further included.

According to a specific example, a lithium salt such as $LiPF_6$, $LiClO_4$, $LiBF_4$ and $LiN(SO_2CF_3)_2$ is added to a mixed solvent of a cyclic carbonate of EC or PC which is a high dielectric solvent and a linear carbonate of DEC, DMC or EMC which is a low viscosity solvent, thereby preparing the lithium salt-containing non-aqueous electrolyte.

DESCRIPTION OF THE DRAWINGS

FIG. 1 is a schematic view of the electrode assembly according to an exemplary embodiment of the present invention;

FIG. 2 is a vertical cross-sectional view of the electrode assembly of FIG. 1;

FIG. 3 is a schematic view of the battery cell according to an exemplary embodiment of the present invention; and FIG. 4 is a graph representing capacity retentions and resistance increase rates of Examples 1 and 2, and Comparative Examples 1 and 2.

DETAILED DESCRIPTION OF THE EMBODIMENTS

Hereinafter, the present invention will be described referring to the drawings according to an exemplary embodiment of the present invention, however, the description is for more easy understanding of the present invention, and the scope of the present invention is not limited thereto.

FIG. 1 and FIG. 2 schematically illustrate the electrode assembly according to an exemplary embodiment of the present invention.

Referring to FIG. 1 and FIG. 2, an electrode assembly 100 has a structure which is spiral-wound in one direction with a separator sheet being interposed between a positive electrode sheet and a negative electrode sheet, in which a positive electrode lead 101 and a negative electrode lead 102 protrude side by side in a parallel direction to a vertical length (y).

The electrode assembly 100 also has a horizontal length (x) equal to or more than approximately three times the vertical length (y).

This structure has relatively increased flexibility by dispersing stress in a direction of the relatively long horizontal length, even in the case that the electrode assembly 100 is bent, and as shown in FIG. 2, both side end portions of the electrode assembly 100 may be bent in the same direction.

The bent electrode assembly 100 as such may have a curvature radius (R), and this curvature radius (R) satisfies the following Equation 1:

$$S[\{1/\ln(x/y)\}*t] = R \quad 1$$

wherein t is an average thickness (mm) of the laminated electrode assembly, x is a horizontal length of the electrode assembly, and y is a vertical length of the electrode assembly, and S is a constant of 8 or more, and $\ln(x/y) \geq 1$.

That is, in the present invention, the curvature radius (R) is determined by the ratio of a horizontal length and a vertical length of the electrode assembly 100, and in particular, as the horizontal length is longer, the electrode assembly 100 is easily bent due to the dispersion of stress, and thus, the electrode assembly may have a relatively higher bending degree, that is, a low curvature radius.

In addition, as the horizontal length is shorter, the dispersion degree of stress is lower, and thus, the electrode assembly 100 may have a high curvature radius so that it has a relatively gently curved shape.

In the present invention, the curvature radius (R) is, as shown in FIG. 2, based on an approximate average position to the thickness of the electrode assembly 100 on a vertical section, and the formulated curvature radius (R) is a preferred size not to cause an undesired defect such as short circuit or distortion in the bent electrode assembly 110.

That is, it should be understood that the curvature radius (R) to maintain a more stably curved shape may be calculated, using the horizontal and vertical lengths of the electrode assembly 100, and Equation 1 provided in the present invention.

Generally, the electrode assembly 100 having a structure in which the electrode and the separator are spiral-wound has the electrodes folded for spiral-winding, and thus, has higher stress, as compared with the electrode assembly 100 in which the electrodes and the separator are simply laminated. Besides, since stress is concentrated on a spiral-wound central portion, when forcibly deforming the electrode assembly for the curved shape, the electrode may be broken or distorted by strong stress.

Accordingly, in general, it is not easy to deform the electrode assembly 100 having a spiral-wound structure into a curved shape, however, as described above, the electrode assembly 100 of the present invention has a relatively long horizontal length, and thus, stress is dispersed relatively in a transverse direction as a whole, resulting in easy deformation. Also, the present invention may provide the electrode assembly 100 having a preferred curvature radius by calculating the corresponding preferred curvature allowing a more stably curved shape to be maintained on the basis of Equation 1 above.

FIG. 3 schematically illustrates the battery cell according to an exemplary embodiment of the present invention.

Referring to FIG. 3, the battery cell has a structure in which the electrode assembly 100 is stored in a variable battery case together with an electrolyte solution.

In addition, the battery cell has a structure in which both side end portions of the electrode assembly 100 and the battery case in positions of facing each other are bent together in the same direction, so that a curved surface is formed on the outer surface of the battery cell.

Therefore, in a device having a curved outer shape, or a device in which the shape of the portion where the battery is mounted is curved, a close contact structure is formed when mounting the battery cell having a curved surface formed in an axial direction, and thus, unnecessary space waste may be minimized, thereby allowing development of the device which is efficient and has various designs according to consumer tastes.

FIG. 4 is a graph representing the capacity retentions and the resistance increase rates of Examples 1 and 2, and Comparative Examples 1 and 2.

Referring to FIG. 4, it is confirmed that Examples 1 and 2 satisfying the constant value S of 8 or more show better capacity retentions than those of Comparative Examples 1 and 2, while the resistance increase rates are not high.

The present invention will be described in more detail in the following experimental examples, but is not limited thereto.

Example 1

A pouch type battery cell was manufactured by spiral-winding an electrode laminate having a structure of a positive electrode sheet, a negative electrode sheet and a separator sheet interposed therebetween so that the ratio of the horizontal length (x) and the vertical length (y) of a jelly-roll type electrode assembly was 1.53, and the thickness thereof was 0.5 mm, storing the electrode assembly in a pouch type battery case together with an electrolyte solution, and sealing the pouch type case.

Example 2

A battery cell was manufactured in the same manner as in Example 1, except for manufacturing the spiral-wound jelly-roll type electrode assembly to have a thickness of 1.65 mm.

Comparative Example 1

A battery cell was manufactured in the same manner as in Example 1, except for manufacturing the electrode assembly to have a thickness of 2.72 mm.

Comparative Example 2

A battery cell was manufactured in the same manner as in Example 1, except for manufacturing the electrode assembly to have a thickness of 2.84 mm.

Experimental Example 1

The initial capacities of the battery cells according to Examples 1 and 2, and Comparative Examples 1 and 2 were measured, and the capacities after repeatedly bending each battery cell by the curvature radius obtained according to the constant values as shown in the following Table 1 were measured, thereby calculating the capacity retention.

TABLE 1

|  | R (curvature radius) | S (constant) |
|---|---|---|
| Example 1 | 15 | 9.80 |
| Example 2 | 15 | 9.90 |
| Comparative Example 1 | 15 | 5.51 |
| Comparative Example 2 | 15 | 5.72 |

TABLE 2

|  | Capacity retention (%) after bending 2,000 times | Capacity retention (%) after bending 4,000 times | Capacity retention (%) after bending 6,000 times | Capacity retention (%) after bending 8,000 times | Capacity retention (%) after bending 10,000 times |
|---|---|---|---|---|---|
| Example 1 | 95% | 94% | 92% | 89% | 85% |
| Example 2 | 93% | 94% | 92% | 88% | 85% |
| Comparative Example 1 | 93% | 93% | 62% | 49% | 42% |
| Comparative Example 2 | 94% | 65% | 53% | 50% | 46% |

Experimental Example 2

The battery resistance values of the battery cells according to Examples 1 and 2, and Comparative Examples 1 and 2 were measured, and the resistance values after repeatedly bending each battery cell by the curvature radius obtained according to the constant values as shown in the Table 1 were measured, thereby calculating the resistance increase rates of the batteries.

TABLE 3

|  | Resistance increase rate (%) after bending 2,000 times | Resistance increase rate (%) after bending 4,000 times | Resistance increase rate (%) after bending 6,000 times | Resistance increase rate (%) after bending 8,000 times | Resistance increase rate (%) after bending 10,000 times |
|---|---|---|---|---|---|
| Example 1 | 109% | 115% | 119% | 140% | 325% |
| Example 2 | 115% | 118% | 136% | 176% | 283% |
| Comparative Example 1 | 102% | 120% | 296% | 354% | 362% |
| Comparative Example 2 | 108% | 123% | 270% | 294% | 310% |

As shown in the above Table 2, the battery cells according to Examples 1 and 2 maintained high capacity retentions of about 85% as compared with the capacity before bending, even after repeatedly bending by the curvature radius satisfying Equation 1, while the capacity retentions of the battery of Comparative Examples 1 and 2 were rapidly decreased after bending 4,000 times. Thus, it is seen that the electrode assemblies of Examples 1 and 2 have high flexibility and excellent battery performance.

Meanwhile, as shown in the above Table 3, in Examples 1 and 2, the resistance increase rates of the electrode assemblies after bending several times were not significantly increased, as compared with Examples 1 and 2, and in particular, the resistance increase rates were slightly raised after bending 6,000 times, however, in Comparative Examples 1 and 2, the resistance increase rates were rapidly raised after bending 6,000 times. Thus, it is seen that the electrode assemblies of the Examples have high flexibility and resistance values which are not significantly changed.

A person with ordinary knowledge in the art to which the present invention pertains may perform various applications and modification within the scope of the present invention, based on the above description.

INDUSTRIAL APPLICABILITY

As described above, the electrode assembly and the battery cell according to the present invention have a relatively longer horizontal length than a vertical length, thereby having a naturally curved shape, and provide a merit of capable of being applied to a device having a curved outer shape, or a device in which the outer shape is flat but the shape of the portion where a battery cell is mounted is curved.

The invention claimed is:

1. An electrode assembly having a one directionally spiral-wound structure with a separator sheet interposed between a positive electrode sheet and a negative electrode sheet, the positive electrode sheet and the negative electrode sheet being wound about a winding axis extending in first and second opposite vertical directions,
   wherein the spiral-wound structure of the electrode assembly has a length (x) in a horizontal direction perpendicular to the winding axis and a height (y) in the first vertical direction, and the spiral-wound structure of the electrode assembly has first and second opposite ends that are separated by the length (x) in the horizontal direction, and a center that is equidistant between the first and second opposite ends,
   wherein the spiral-wound structure of the electrode assembly is configured to be bent about a bending axis extending in the first and second opposite vertical directions, the bending axis being parallel to the winding axis, the spiral-wound structure having a naturally curved shape having a curvature radius (R) naturally formed without additional external force, the curvature radius (R) relative to the bending axis satisfying the following Equation 1:

$$S[\{1/\ln(x/y)\}*t]=R \qquad 1$$

wherein t is an average thickness (mm) of the spiral-wound electrode assembly in radial directions extending perpendicularly from the bending axis toward the spiral-wound structure and S is a constant of 8 or more, and wherein the spiral-wound structure of the electrode assembly is configured to be repeatedly movable between two positions including a position in which opposing sides of the electrode assembly have a planar shape parallel to one another and in which the first and second opposite ends of the spiral-wound structure of the electrode assembly are spaced apart from the bending axis by a first distance that is greater than the curvature radius (R) and the center is spaced apart from the bending axis by a second distance that is equal to the curvature radius (R), and a position having the naturally curved shape in which the spiral-wound structure of the electrode assembly is bent about the bending axis according to the Equation 1 and in which the first and second opposite ends and the center of the spiral-wound structure of the electrode assembly are spaced apart from the bending axis by a second distance that is equal to the curvature radius (R).

2. The electrode assembly of claim 1, wherein the curvature radius (R) is 5 mm to 20 mm.

3. The electrode assembly of claim 1, wherein the length (x) in the horizontal direction perpendicular to the winding axis is 50 mm to 500 mm.

4. The electrode assembly of claim 1, wherein a positive electrode lead and a negative electrode lead protrude side by side from the spiral-wound structure of the electrode assembly in the first vertical direction.

5. The electrode assembly of claim 1, wherein S is a constant of 9 to 12.

6. The electrode assembly of claim 1, wherein the electrode assembly has a structure having relatively increased flexibility for deformation into a curved shape by dispersing stress in a direction of the relatively long horizontal length.

7. The electrode assembly of claim 1, wherein the spiral-wound structure of the electrode assembly includes winding of the positive electrode sheet and the negative electrode sheet about the winding axis five times or less.

8. A battery cell having a structure in which an electrode assembly is stored in a flexible battery case together with an electrolyte solution, wherein the electrode assembly has a one directionally spiral-wound structure with a separator sheet interposed between a positive electrode sheet and a negative electrode sheet, the positive electrode sheet and the negative electrode sheet being wound about a winding axis extending in first and second opposite vertical directions, wherein the spiral-wound structure of the electrode assembly has a length (x) in a horizontal direction perpendicular to the winding axis and a height (y) in the first vertical direction, and the spiral-wound structure of the electrode assembly has first and second opposite ends that are separated by the length (x) in the horizontal direction, and a center that is equidistant between the first and second opposite ends, wherein the spiral-wound structure of the electrode assembly is configured to be bent about a bending axis extending in the first and second opposite vertical directions, the bending axis being parallel to the winding axis, the spiral-wound structure having a naturally curved shape having a curvature radius (R) naturally formed without additional external force, the curvature radius (R) relative to the bending axis satisfying the following Equation 1:

$$S[\{1/\ln(x/y)\}*t]=R \qquad 1$$

wherein t is an average thickness (mm) of the spiral-wound electrode assembly in radial directions extending perpendicularly from the bending axis toward the spiral-wound structure and S is a constant of 8 or more, wherein the spiral-wound structure of the electrode assembly is configured to be repeatedly movable between two positions including a position in which opposing sides of the electrode assembly have a planar shape parallel to one another and in which the first and second opposite ends of the spiral-wound structure of the electrode assembly are spaced apart from the bending axis by a first distance that is greater than the curvature radius (R) and the center is spaced apart from the bending axis by a second distance that is equal to the curvature radius (R), and a position having the naturally curved shape in which the spiral-wound structure of the electrode assembly is bent about the bending axis according to the Equation 1 and in which the first and second opposite ends and the center of the spiral-wound structure of the electrode assembly are spaced apart from the bending axis by a second distance that is equal to the curvature radius (R), and wherein a curved surface is formed on an outer surface of the flexible battery case when the spiral-wound structure is in the naturally curved shape.

9. A method of forming a flexible battery cell comprising an electrode assembly stored in a flexible battery case, the method comprising:

forming a spiral-wound structure of the electrode assembly having a one directionally spiral-wound structure with a separator sheet interposed between a positive electrode sheet and a negative electrode sheet, the spiral-wound structure having a length (x) in a horizontal direction perpendicular to a winding axis and a height (y) in the first vertical direction, the spiral-wound structure being configured to be repeatedly moved between two positions including a first position and a second position having a naturally curved shape in which the spiral-wound structure is bent about a bending axis extending in the first and second opposite vertical directions, the bending axis being parallel to the winding axis;

before the forming of the spiral-wound structure, selecting the length (x) and the height (y) such that the spiral-wound structure in the stably curved position has a curvature radius (R) relative to the bending axis satisfying the following Equation 1:

$$S[\{1/\ln(x/y)\}*t]=R \qquad 1$$

wherein t is an average thickness (mm) of the spiral-wound electrode assembly in radial directions extending perpendicularly from the bending axis toward the spiral-wound structure and S is a constant of 8 or more; and inserting the spiral-wound structure into the flexible battery case together with an electrolyte solution, the flexible battery case being configured such that an outer surface of the flexible battery cell has a curved shape when the spiral-wound structure is in the naturally curved shape.

* * * * *